(12) United States Patent
Zhao et al.

(10) Patent No.: US 11,175,548 B2
(45) Date of Patent: Nov. 16, 2021

(54) DISPLAY PANEL, DISPLAY APPARATUS AND DRIVING METHOD FOR THE SAME

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Na Zhao, Beijing (CN); Liyun Deng, Beijing (CN); Xufei Xu, Beijing (CN); Jianying Zhan, Beijing (CN); Lijuan Yang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 754 days.

(21) Appl. No.: 16/064,447

(22) PCT Filed: Nov. 27, 2017

(86) PCT No.: PCT/CN2017/113077
§ 371 (c)(1),
(2) Date: Jun. 20, 2018

(87) PCT Pub. No.: WO2018/157634
PCT Pub. Date: Sep. 7, 2018

(65) Prior Publication Data
US 2021/0208460 A1 Jul. 8, 2021

(30) Foreign Application Priority Data
Feb. 28, 2017 (CN) .......................... 201710115345.5

(51) Int. Cl.
*G02F 1/1368* (2006.01)
*G02F 1/1362* (2006.01)

(52) U.S. Cl.
CPC ...... *G02F 1/136286* (2013.01); *G02F 1/1368* (2013.01)

(58) Field of Classification Search
CPC .................................................. G02F 1/136286
See application file for complete search history.

(56) References Cited

U.S. PATENT DOCUMENTS

| 6,970,221 B1 | 11/2005 | Park et al. |
| 8,471,973 B2 | 6/2013 | Hsiang-Lin et al. |
| | (Continued) | |

FOREIGN PATENT DOCUMENTS

| CN | 102790093 A | 11/2012 |
| CN | 106094377 A | 11/2016 |
| | (Continued) | |

OTHER PUBLICATIONS

International Search Report and Written Opinion dated Mar. 21, 2018 in PCT/CN2017/113077.
1st Office Action dated Jun. 28, 2019 in CN201710115345.5.

*Primary Examiner* — Sang V Nguyen
(74) *Attorney, Agent, or Firm* — Syncoda LLC; Feng Ma

(57) ABSTRACT

A display panel includes an array substrate having a first substrate, a gate line, a data line, and a thin film transistor (TFT); and a plurality of sub-pixel regions defined by the gate and data lines; and an opposite substrate including a second substrate, a plurality of additional electrodes arranged on a side of the second substrate facing the array substrate; at least one sub-pixel region including at least one of: a first overlap region at an intersection region by the gate and data lines, a second overlap region between the TFT gate and source electrodes, or a third overlap region between the TFT gate and drain electrodes; and an orthographic projection of the additional electrodes on the first substrate substantially overlaps with orthographic projections of at least
(Continued)

one of the first, second, or third overlap regions on the first substrate.

20 Claims, 6 Drawing Sheets

(56) References Cited

U.S. PATENT DOCUMENTS

| | | | |
|---|---|---|---|
| 8,570,475 B2 | 10/2013 | Kun et al. | |
| 2006/0139526 A1 | 6/2006 | Byung et al. | |
| 2014/0070221 A1* | 3/2014 | Li | H01L 29/78678 257/59 |
| 2014/0078104 A1* | 3/2014 | Lee | G06F 3/0412 345/174 |
| 2015/0362796 A1* | 12/2015 | Kong | G02F 1/136286 349/106 |
| 2016/0357308 A1* | 12/2016 | Li | G02F 1/13439 |

FOREIGN PATENT DOCUMENTS

| | | |
|---|---|---|
| WO | 2013040798 A1 | 3/2013 |
| WO | 2015043177 A1 | 4/2015 |

* cited by examiner

DISPLAY PANEL, DISPLAY APPARATUS AND DRIVING METHOD FOR THE SAME

The present application claims priority to Chinese Application No. 201710115345.5, filed on Feb. 28, 2017, the entire contents of which are hereby incorporated by reference.

FIELD OF THE DISCLOSURE

The present disclosure relates to a display technology field, especially to a display panel, display apparatus and driving method for the same.

BACKGROUND

TFT-LCD (Thin Film Transistor-Liquid Crystal Display) is widely used because it has a small size, low power consumption, no radiation, relatively low production cost, or the like.

The TFT-LCD comprises a plurality of sub-pixels, each of which comprises a TFT, a pixel electrode and a common electrode. The gate electrode of the TFT is electrically connected to the gate line, the source electrode is electrically connected to the data line, and the pixel electrode and the common electrode form a liquid crystal capacitance. When a scanning signal is input to the gate line, the TFT is turned on, and the data signal is loaded into the source electrode of the TFT through the data line, then reach the pixel electrode to control the voltage between the liquid crystal capacitance, and then control the inclination angle of the liquid crystal molecules so as to control the light transmittance.

However, because the coupling of TFT, gate lines, data lines and so on normally generate parasitic capacitance, which affects the liquid crystal capacitance. Further, the parasitic capacitance may cause the liquid crystal molecule to deflect disorderly, decreasing the display quality.

SUMMARY

The present disclosure provides a display panel, display apparatus, and driving method for the same, which reduce the impact of parasitic capacitance on the display quality.

A display panel comprises an array substrate comprising: a first substrate; a gate line, a data line, and a thin film transistor with a gate electrode, a source electrode and a drain electrode on a surface of the first substrate; and a plurality of sub-pixel regions on the array substrate defined by the gate line and the data line; and an opposite substrate comprising a second substrate, a plurality of additional electrodes arranged on a side of the second substrate facing the array substrate; at least one sub-pixel region comprises at least one of: a first overlap region at an intersection region by the gate line and the data line, a second overlap region defined by an overlapping region between the gate electrode and the source electrode, or a third overlap region defined by an overlapping region between the gate electrode and the drain electrode; and an orthographic projection of the additional electrodes on the first substrate substantially overlaps with orthographic projections of at least one of the first overlap region, the second overlap region, or the third overlap region on the first substrate.

Optionally, the orthographic projection of the additional electrodes on the first substrate completely overlaps with the orthographic projections of the first overlap region, the second overlap region and the third overlap region.

Optionally, the additional electrodes comprise a first additional sub-electrode; the orthographic projections of the first additional sub-electrode and the first overlap region on the first substrate overlap and have equal areas.

Optionally, the additional electrodes comprise a second additional sub-electrode; the orthographic projections of the second additional sub-electrode and the second overlap region on the first substrate overlap and have equal areas.

Optionally, the additional electrodes comprise a third additional sub-electrode; the orthographic projections of the third additional sub-electrode and the third overlap region on the first substrate overlap and have equal areas.

Optionally, all of the additional electrodes are electrically connected through a connecting line; the orthographic projections of the connecting line have non-overlapping region with the gate line and the data line on the first substrate.

Optionally, the display panel comprises an additional electrode lead, wherein the connecting line is configured to be powered through the additional electrode lead.

Optionally, the array substrate further comprises a pixel electrode, and the opposite substrate further comprises a common electrode; wherein contour of the pixel electrode is substantially the same as contour of the common electrode.

Optionally, the additional electrode and the common electrode are configured to be controlled independently.

Optionally, the pixel electrode and the common electrode overlap and have a same area.

Optionally, the orthographic projections of the common electrode have non-overlapping region with the additional electrode on the second substrate.

Optionally, all of the common electrodes are electrically connected with each other.

Optionally, the additional electrode is in the same layer as the common electrode.

Optionally, the display panel comprises an insulating layer between the additional electrode and the common electrode, the additional electrode and the common electrode are in different layers.

A display apparatus comprises the display panel according to any one of the above description, a first integrated circuit (IC) configured to provide a scanning voltage to the gate line; a second IC configured to provide a data voltage to the data line; and a third IC configured to provide a constant voltage to the additional electrode, and the constant voltage is not equal to the scan voltage and the data voltage.

Optionally, the third IC is integrated with at least one of the first IC and the second IC.

A display substrate in a display panel, wherein the display panel comprises: a first substrate; a gate line, a data line, and a thin film transistor with a gate electrode, a source electrode and a drain electrode on a surface of the first substrate; and a plurality of sub-pixel regions with each comprises a pixel electrode on the array substrate defined by the gate line and the data line; at least one sub-pixel region comprises: a first overlap region at an intersection region by the gate line and the data line, a second overlap region defined by an overlapping region between the gate electrode and the source electrode, or a third overlap region defined by an overlapping region between the gate electrode and the drain electrode; the display substrate comprising: a base substrate; a common electrode with a substantially same contour with the pixel electrode; and a plurality of additional electrodes with a complementary contour with the common electrode, wherein: the common electrode are insulated from the plurality of additional electrodes; and an orthographic projection of the additional electrodes on the first substrate substantially overlaps with orthographic projections of at least one of the first overlap region, the second overlap region, or the third overlap region on the first substrate.

A driving method for the display panel according to the above description, the method comprises inputting a scanning voltage to the gate line; inputting a data voltage to the data line; inputting a constant voltage different from the scan voltage and the data voltage to the additional electrode to generate at least one additional parasitic capacitance for offsetting parasitic capacitance generated by at least one of the gate line and the data line, the gate electrode and the source electrode, or the gate electrode and the drain electrode.

BRIEF DESCRIPTION OF THE DRAWINGS

In order to illustrate the embodiments of the present disclosure or the technical solutions in the prior art more clearly, the following drawings which are to be used in the description of the embodiments or the prior art will be briefly described. It will be understandable that the drawings in the following description are some embodiments of the present disclosure, and other drawings may be obtained by the skilled in the art without the creative work.

DETAILED DESCRIPTION OF ILLUSTRATED EMBODIMENTS

The embodiments of the present disclosure will now be described clearly and completely in conjunction with the accompanying drawings in the embodiments of the present disclosure, and it will be apparent that the described embodiments are merely part of the embodiments of the present disclosure and are not intended to be exhaustive. Based on embodiments in the present disclosure, all other embodiments obtained by those of ordinary skilled in the art without creative work are within the scope of the present disclosure.

Figure 1:
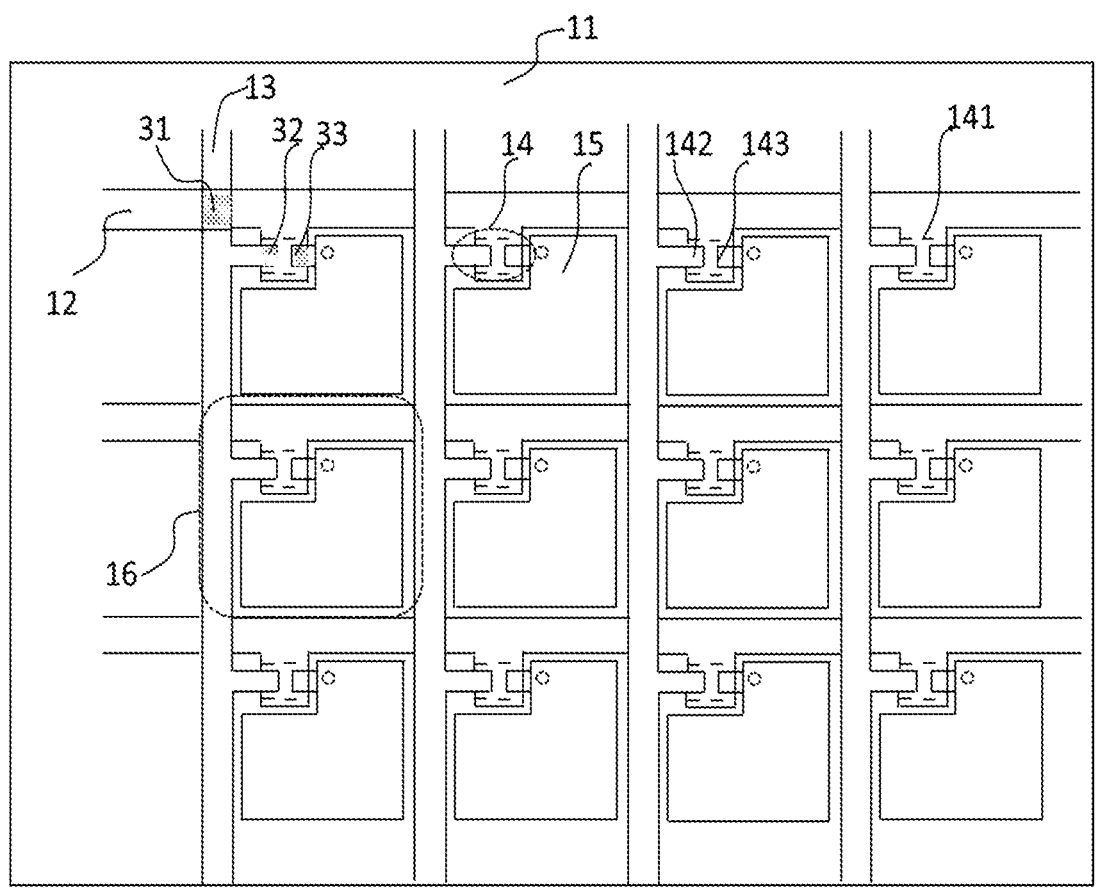
FIG. 1 is a schematic top view of an array substrate provided in one or more embodiments of the present disclosure.
Figure 2:
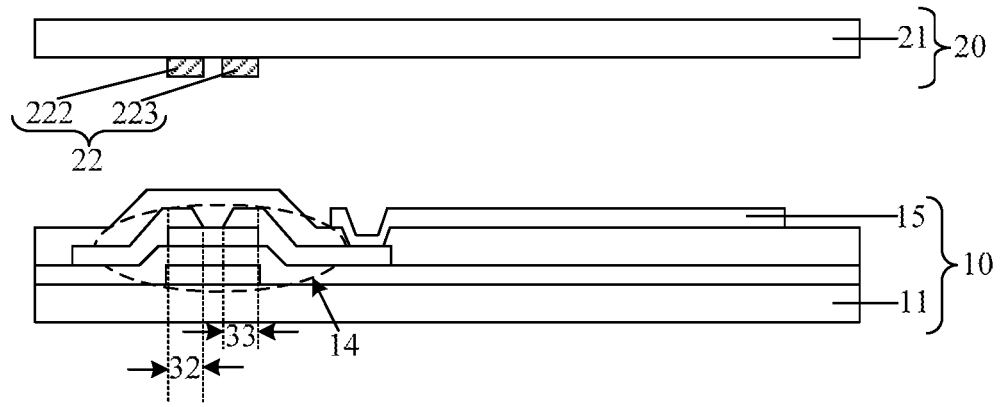
FIG. 2 is a schematic cross-sectional view of a display panel provided in one or more embodiments of the present disclosure.
Figure 3:
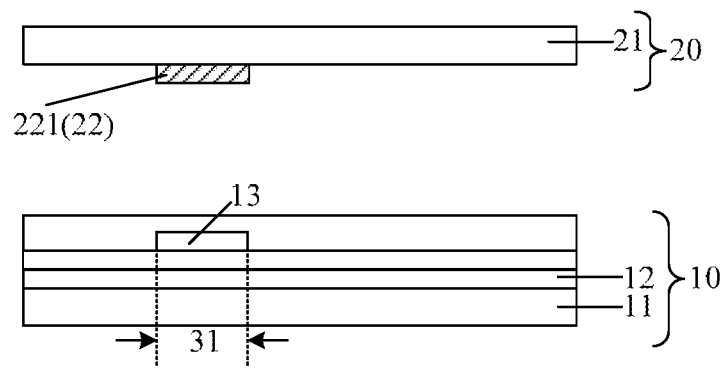
FIG. 3 is another schematic cross-sectional view of a display panel provided in one or more embodiments of the present disclosure.

As shown in FIGS. 1-3, the embodiments of the present disclosure provide a display panel, which comprises an array substrate 10 and an opposite substrate 20. The array substrate 10 comprises a first substrate 11, a gate line 12, a data line 13 and a thin film transistor 14 arranged on the surface of the first substrate 11, and the opposite substrate 20 comprises a second substrate 21, a plurality of additional electrodes 22 arranged on the side of the second substrate 21 facing the array substrate 10.

Generally, the gate line 12 and the data line 13 intersect with each other and define a sub-pixel region 16. There are a plurality of sub-pixel region in one pixel region. In each sub-pixel region, the gate line 12 and the data line 13 form a first overlap region 31, gate electrode 141 and source electrode 142 of the thin film transistor form a second overlap region 32, gate electrode 141 and drain electrode 143 of the thin film transistor form a third overlap region 33; in each sub-pixel region, the orthographic projection of the additional electrode 22 on the first substrate 11 substantially overlaps with the orthographic projection of at least one of the first overlap region 31, the second overlap region 32, and the third overlap region 33. In some embodiments, in each sub-pixel region, the orthographic projection of the additional electrode 22 on the first substrate 11 and the orthographic projection of at least one of the first overlap region 31, the second overlap region 32, and the third overlap region 33 on the first substrate 11 overlap and have equal areas. The orthographic projection herein is a projection on the first substrate 11 in the direction of the thickness of the display panel.

In some embodiments of the present disclosure, the additional electrode 22 is provided on the second substrate 21 of the opposite substrate 20 for the purpose of generating an additional parasitic capacitance connecting in series with the original parasitic capacitance on the array substrate 10, thus offsetting the original parasitic capacitance on the array substrate 10 by the additional parasitic capacitance. The original parasitic capacitance on the array substrate 10 can be, for example, a first parasitic capacitance C1 (as shown in FIG. 4A) generated by the gate line 12 and the data line 13 in the first overlap region 31; and/or a second parasitic capacitance generated C2 (as shown in FIG. 4B) by the gate electrode 141 and the source electrode 142 in the second overlap region 32; and/or a third parasitic capacitance C3 (as shown in FIG. 4C) generated by the gate electrode 141 and the drain electrode 143 in the third overlap region 33.

Figure 4A:
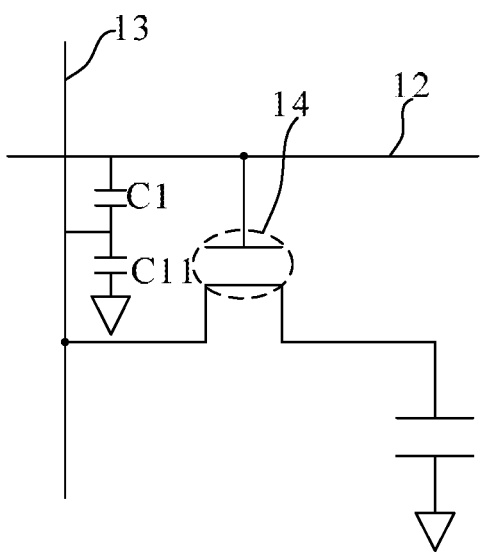
FIG. 4A is equivalent circuit diagram provided in one or more embodiments of the present disclosure.
Figure 4B:
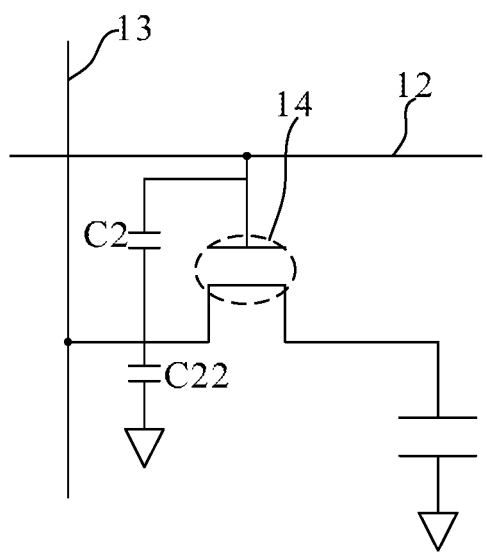
FIG. 4B is equivalent circuit diagram provided in one or more embodiments of the present disclosure.
Figure 4C:
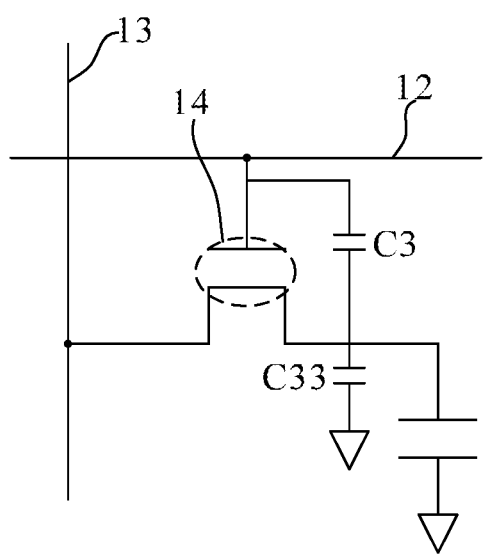
FIG. 4C is equivalent circuit diagram provided in one or more embodiments of the present disclosure.

For example, as shown in FIG. 4A, taking a sub-pixel region as an example, when the orthographic projection of the additional electrode 22 and the orthographic projection of the first overlap region 31 on the first substrate 11 overlap and have equal areas, a first additional parasitic capacitance C11 generates between the additional electrode 22 and the gate line 12 near the additional electrode 22 in the first overlap region 31, or between the additional electrode 22 and the data line 13 near the additional electrode 22 in the first overlap region 31.

The first parasitic capacitance C1 may be expressed by the formula of $$C1 = \frac{\varepsilon s_1}{4\pi \kappa d_1},$$

the first additional parasitic capacitance C11 may be expressed by the formula of $$C11 = \frac{\varepsilon s_2}{4\pi\kappa d_2}.$$

$S_1$ represents an overlapping area of the first overlap region 31, $S_2$ represents an overlapping area between the additional electrode 22 and the first overlap region 31, $d_1$ represents a vertical distance from the gate line 12 and the data line 13, $d_2$ represents a vertical distance from the additional electrode 22 to the first overlap region 31, $\xi$ represents dielectric constant value and K represents a constant number. Since the thickness of the liquid crystal cell is much larger than the distance between the gate line 12 and the data line 13 generating the first parasitic capacitance C1, that is $d_1 \ll d_2$ and $S_1 = S_2$, so C1>>C11, $$\frac{C1}{C11} = \infty.$$

On this basis, C1 and C11 connect in series, and the equivalent capacitance of them is:

$$\frac{C1 \times C11}{C1 + C11} = \frac{C1}{1 + \frac{C1}{C11}}.$$

Based on this, the equivalent capacitance tends to zero due to $$\frac{C1}{C11} = \infty.$$

Similarly, as shown in FIG. 4B, taking a sub-pixel region as an example, when the orthographic projection of the additional electrode 22 and the orthographic projection of the second overlap region 32 on the first substrate 11 overlap and have equal areas, a second additional parasitic capacitance C22 generates between the additional electrode 22 and the gate electrode 141 near the additional electrode 22 in the second overlap region 32, or between the additional electrode 22 and the source electrode 142 near the additional electrode 22 in the second overlap region 32.

The second parasitic capacitance C2 may be expressed by the formula of $$C2 = \frac{\varepsilon s_3}{4\pi\kappa d_3},$$

the second additional parasitic capacitance C22 may be expressed by the formula of $$C22 = \frac{\varepsilon s_4}{4\pi\kappa d_4}.$$

$S_3$ represents an overlapping area of the second overlap region 32, $S_4$ represents an overlapping area between the additional electrode 22 and the second overlap region 32, $d_3$ represents a vertical distance from the gate electrode 141 and the source electrode 142, $d_4$ represents a vertical distance from the additional electrode 22 to the second overlap region 32, $\xi$ represents dielectric constant value and K represents a constant number. Since the thickness of the liquid crystal cell is much larger than the distance between the gate electrode 141 and the source electrode 142 generating the second parasitic capacitance C2, that is $d_3 \ll d_4$ and $S_3 = S_4$, so C2>>C22, $$\frac{C2}{C22} = \infty.$$

On this basis, C2 and C22 connect in series, and the equivalent capacitance of them is:

$$\frac{C2 \times C22}{C2 + C22} = \frac{C2}{1 + \frac{C2}{C22}}.$$

Based on this, the equivalent capacitance tends to zero due to $$\frac{C2}{C22} = \infty.$$

Similarly, as shown in FIG. 4C, taking a sub-pixel region as an example, when the orthographic projection of the additional electrode 22 and the orthographic projection of the third overlap region 33 on the first substrate 11 overlap and have equal areas, a third additional parasitic capacitance C33 generates between the additional electrode 22 and the gate electrode 141 near the additional electrode 22 in the third overlap region 33, or between the additional electrode 22 and the drain electrode 143 near the additional electrode 22 in the third overlap region 33.

The third parasitic capacitance C3 may be expressed by the formula of $$C3 = \frac{\varepsilon s_5}{4\pi\kappa d_5},$$

the third additional parasitic capacitance C33 may be expressed by the formula of $$C33 = \frac{\varepsilon s_6}{4\pi\kappa d_6}.$$

$S_5$ represents an overlapping area of the third overlap region 33, $S_6$ represents an overlapping area between the additional electrode 22 and the third overlap region 33, $d_5$ represents a vertical distance from the gate electrode 141 and the drain electrode 143, $d_6$ represents a vertical distance from the additional electrode 22 to the third overlap region 33, $\xi$ represents dielectric constant value and K represents a constant number. Since the thickness of the liquid crystal cell is much larger than the distance between the gate electrode 141 and the drain electrode 143 generating the third parasitic capacitance C3, that is $d_5 \ll d_6$ and $S_5 = S_6$, so $$C3 \gg C33, \frac{C3}{C33} = \infty.$$

On this basis, C3 and C33 connect in series, and the equivalent capacitance of them is:

$$\frac{C3 \times C33}{C3 + C33} = \frac{C3}{1 + \frac{C3}{C33}}.$$

Based on this, the equivalent capacitance tends to zero due to $$\frac{C3}{C33} = \infty.$$

It is noted that, firstly, it will be apparent to those skilled in the art that the gate electrode 141 of the thin film transistor is electrically connected to the gate line 12, and the source electrode 142 of the thin film transistor is electrically connected to the data line 13. The area defined by any adjacent gate lines 12 and any adjacent data lines 13 is a sub-pixel region.

Secondly, the additional electrode 22 corresponds to the sub-pixel region one to one.

For any sub-pixel region, the additional electrodes 22 may be arranged in the following ways.

In the first arrangement, the orthographic projection of the additional electrode 22 only overlaps and has equal area with that of the first overlap region 31 on the first substrate 11. That is, the orthographic projection of the additional electrode 22 on the first substrate 11 exactly covers the orthographic projection of the first overlap region 31 on the first substrate 11.

In the second arrangement, the orthographic projection of the additional electrode 22 only overlaps and has equal area with that of the second overlap region 32 on the first substrate 11. That is, the orthographic projection of the additional electrode 22 on the first substrate 11 exactly covers the orthographic projection of the second overlap region 32 on the first substrate 11.

In the third arrangement, the orthographic projection of the additional electrode 22 only overlaps and has equal area with that of the third overlap region 33 on the first substrate 11. That is, the orthographic projection of the additional electrode 22 on the first substrate 11 exactly covers the orthographic projection of the third overlap region 33 on the first substrate 11.

In the fourth arrangement, the orthographic projections of the additional electrode 22 and the first overlap region 31, the second overlap region 32 on the first substrate 11 overlap and have equal areas. That is, the orthographic projection of the additional electrode 22 on the first substrate 11 exactly covers the orthographic projections of the first overlap region 31 and the second overlap region 32 on the first substrate 11.

In the fifth arrangement, the orthographic projections of the additional electrode 22 and the first overlap region 31, the third overlap region 33 on the first substrate 11 overlap and have equal areas. That is, the orthographic projection of the additional electrode 22 on the first substrate 11 exactly covers the orthographic projections of the first overlap region 31 and the third overlap region 33 on the first substrate 11.

In the sixth arrangement, the orthographic projections of the additional electrode 22 and the second overlap region 32, the third overlap region 33 on the first substrate 11 overlap and have equal area. That is, the orthographic projection of the additional electrode 22 on the first substrate 11 exactly covers the orthographic projections of the second overlap region 32 and the third overlap region 33 on the first substrate 11.

In the seventh arrangement, the orthographic projections of the additional electrode 22 and the first overlap region 31, the second overlap region 32, the third overlap region 33 on the first substrate 11 overlap and have equal areas. That is, the orthographic projection of the additional electrode 22 on the first substrate 11 exactly covers the orthographic projections of the first overlap region 31, the second overlap region 32 and the third overlap region 33 on the first substrate 11.

Thirdly, it will be apparent to those skilled in the art that the orthographic projections of the additional electrode 22 and the corresponding overlap region on the first substrate 11 may not overlap completely and have exact equal areas due to the limitations of manufacture technology, a slight deviation may exist, but in the above derivation process of equivalent capacitance, the relationship of S1≈S2, S3≈S4 and S5≈S6 also exist, therefore, the result of equivalent capacitance is not affected.

Fourthly, the thin film transistor 14 may be of any type of structure, such as an amorphous silicon thin film transistor, an oxide semiconductor thin film transistor, a polysilicon thin film transistor, an organic thin film transistor, or the like.

Fifthly, only the structure related to the above-described technical solution is shown on the opposite substrate 20 in FIGS. 2 and 3, and other conventional structures are not shown in FIGS. 2 and 3. In addition, FIGS. 2 and 3 are cross-sectional views taken in different directions along the display panel.

The present disclosure provides a display panel, the additional electrodes 22 located in each the sub-pixel region are arranged on the opposite substrate 20, and the orthographic projection of the additional electrode 22 on the first substrate 11 and the orthographic projection of at least one of the first overlap region 31, the second overlap region 32, and the third overlap region 33 arranged on the array substrate 10 on the first substrate 11 overlap and have equal areas, which is equivalent to the additional parasitic capacitance is connected in series with the parasitic capacitance generating in the overlap region corresponding to the additional electrode 22, according to the capacitance formula, since the additional parasitic capacitance is much smaller than the parasitic capacitance generating in the overlap region on the array substrate 10, and thus the equivalent capacitance of the additional parasitic capacitance and the parasitic capacitance generating in the overlap region on the array substrate 10 tends to zero. Based on this, the parasitic capacitance generated by the array substrate 10 may be weakened or even eliminated, and the display effect will be improved.

Figure 5:
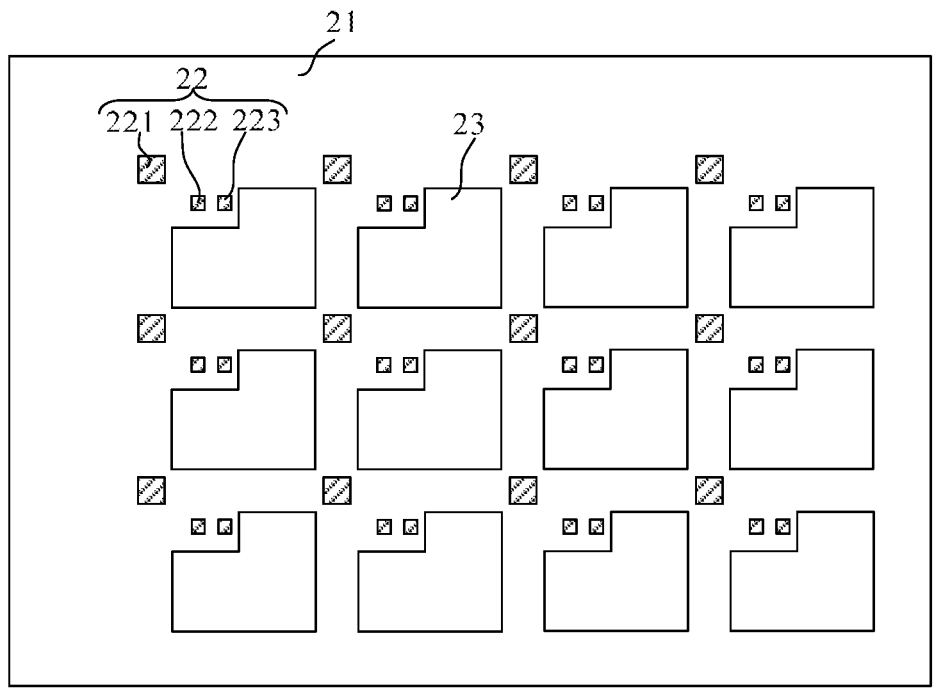
FIG. 5 is schematic top view of an opposite substrate provided in one or more embodiments of the present disclosure.

Alternatively or additionally, as shown in FIGS. 2, 3 and 5, additional electrodes 22 comprise a first additional sub-electrode 221, a second additional sub-electrode 222, and a third additional sub-electrode 223.

The orthographic projections of the first additional sub-electrode 221 and the first overlap region 31 on the first substrate 11 overlap and have equal areas; the orthographic projections of the second additional sub-electrode 222 and the second overlap region 32 on the first substrate 11 overlap and have equal areas; the orthographic projections of the third additional sub-electrode 223 and the third overlap region 33 on the first substrate 11 overlap and have equal areas.

That is, a first additional parasitic capacitance C11 generates between the first additional electrode 221 and the gate line 12 near the additional electrode 22 in the first overlap region 31, or between the first additional electrode 221 and the data line 13 near the additional electrode 22 in the first overlap region 31, so as to connect in series to the first parasitic capacitance C1 generated by the gate line 12 and the data line 13 in the first overlap region 31, thus achieving the purpose of eliminating the first parasitic capacitance C1.

A second additional parasitic capacitance C22 generates between the second additional electrode 222 and the gate electrode 141 near the additional electrode 22 in the second overlap region 32, or between the second additional electrode 222 and the source electrode 142 near the additional electrode 22 in the second overlap region 32, so as to connect in series to the second parasitic capacitance C2 generated by the gate electrode 141 and the source electrode 142 in the second overlap region 32, thus achieving the purpose of eliminating the second parasitic capacitance C2.

A third additional parasitic capacitance C33 generates between the third additional electrode 223 and the gate electrode 141 near the additional electrode 22 in the third overlap region 33, or between the third additional electrode 223 and the drain electrode 143 near the additional electrode 22 in the third overlap region 33, so as to connect in series to the third parasitic capacitance C3 generated by the gate electrode 141 and the drain electrode 143 in the third overlap region 33, thus achieving the purpose of eliminating the third parasitic capacitance C3.

It is noted that, "the orthographic projections of the first additional sub-electrode 221 and the first overlap region 31 on the first substrate 11 overlap and have equal areas" is described as "the first additional sub-electrode 221 corresponds to the first overlap region 31" or the equivalents thereof hereinafter, for the sake of convenience. It will be understood by those skilled in the art that the two descriptions have the same meaning in the present disclosure. In addition, the "the orthographic projections of second additional sub-electrode 222 and the second overlap region 32 on the first substrate 11 overlap and have equal areas", and the "second additional sub-electrode 222 corresponds to the second overlap region 32" or its equivalent description have the same meaning; "the orthographic projections of the third additional sub-electrode 223 and the third overlap region 33 on the first substrate 11 overlap and have equal areas", and "the third additional sub-electrode 223 corresponds to the third overlap region 33" or its equivalent description, also have the same meaning.

On the basis of this, the parasitic capacitance on the array substrate 10 may be eliminated maximally to make the display effect better.

Figure 9:
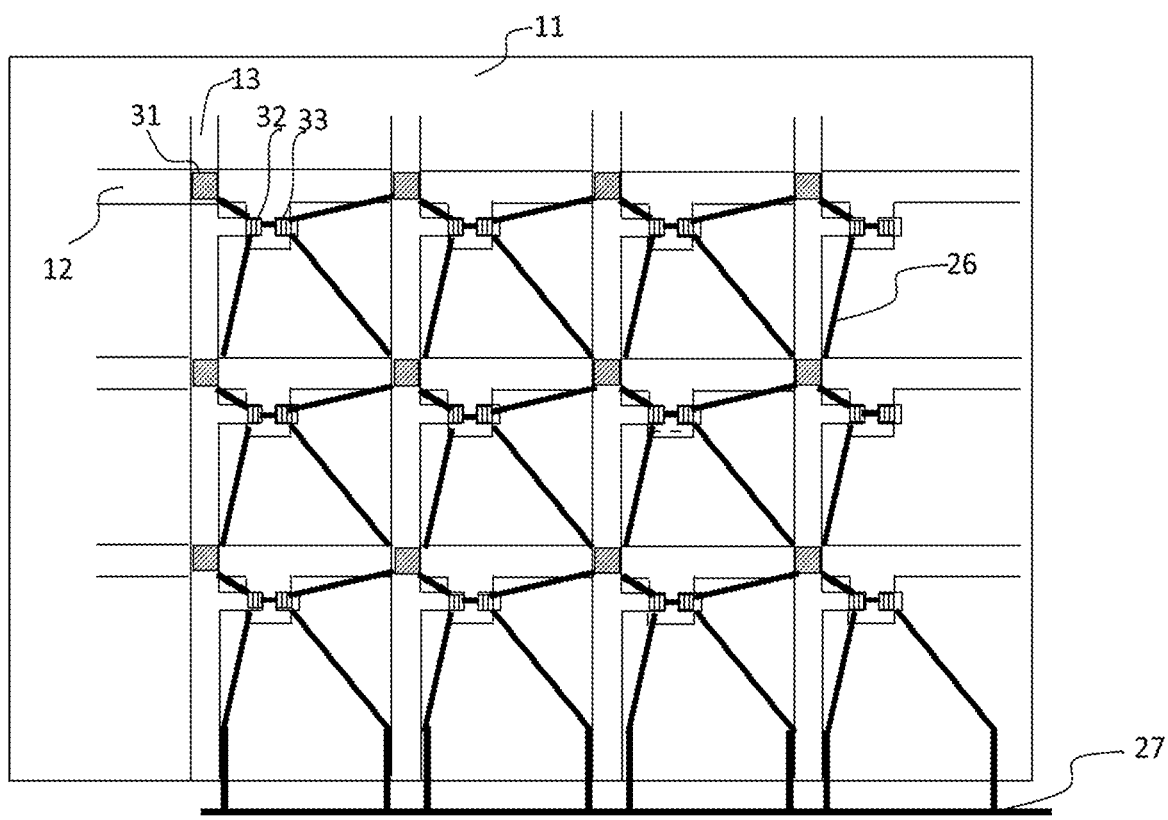
FIG. 9 is schematic top view of an opposite substrate provided in one or more embodiments of the present disclosure.

Alternatively or additionally, all of the additional electrodes 22 are electrically connected by a connecting line 26 as shown in FIG. 9.

Optionally, the orthographic projections of the connecting line 26 and the gate line 12, the data line 13 on the first substrate 11 have minor overlap as shown in FIG. 9. Alternatively, the orthographic projections of the connecting line 26 and the gate line 12, the data line 13 on the first substrate 11 have no overlap.

For example, when the additional electrode 22 comprises only the first additional sub-electrode 221 corresponding to the first overlap region 31, all the first additional sub-electrodes 221 are electrically connected by the connecting line 26. When the additional electrode 22 comprises only the second additional sub-electrode 222 corresponding to the second additional region 32, all the second additional sub-electrodes 222 are electrically connected by the connecting line 26. When the additional electrode 22 comprises only the third additional sub-electrode 223 corresponding to the third overlapping region 33, all the third additional sub-electrodes 223 are electrically connected by the connecting line 26. When the additional electrode 22 comprises only the first additional sub-electrode 221 corresponding to the first overlap region 31 and the second additional sub-electrode 222 corresponding to the second overlap region 32, all of the first additional sub-electrode 221 and all of the second additional sub-electrodes 222 are electrically connected by the connection line 26. When the additional electrode 22 comprises only the first additional sub-electrode 221 corresponding to the first overlap region 31 and the third additional sub-electrode 223 corresponding to the third overlap region 33, all of the first additional sub-electrode 221 and all of the third additional sub-electrodes 223 are electrically connected by the connection line 26. When the additional electrode 22 comprises only the second additional sub-electrode 222 corresponding to the second overlapping region 32 and the third additional sub-electrode 223 corresponding to the third overlap region 33, all of second additional sub-electrode 222 and all of the third additional sub-electrodes 223 are electrically connected by the connection line 26; when the additional electrode 22 comprises the first additional sub-electrode 221 corresponding to the first overlap region 31, the second additional sub-electrode 222 corresponding to the second overlapping region 32, and the third additional sub-electrode 223 corresponding to the third overlapping region 33, all the first additional sub-electrodes 221, all the second additional sub-electrode 222 and all the third additional sub-electrodes 223 are electrically connected by the connection line 26.

Optionally, the connecting line 26 may be electrically connected to an additional electrode lead 27. Optionally, A conductive gold ball may be doped in the sealing adhesive positioned between the array substrate 10 and the opposite substrate 20. On the basis of this, the process is simplified due to the convenience of supplying power to the additional electrode 22. Optionally, the conductive gold ball can also be arranged in other structures as long as the additional electrode lead 27 may be and the connecting line 26 can be supplied power.

The additional electrode lead 27 is electrically connected to the connecting line 26 in the present disclosure, which leads to the additional electrode lead 27 connects to the power supply IC (integrated circuit), thereby facilitating the IC to supply power to the connecting line through the additional electrode lead.

Further, the additional electrode 22 and the connecting line 26 may be arranged in the same layer, that is, the additional electrode 22 and the connecting line 26 are formed in one patterning process.

Further, another additional electrode lead is further provided on the array substrate; and the additional electrode lead is electrically connected to the connecting line 26 through a conductive gold ball. The additional electrode lead may be arranged in the same layer with a metal layer on the array substrate 10, such as a gate metal layer comprising a gate electrode 141, or a source-drain metal layer comprising a source electrode 142 and a drain electrode 143.

Based on the above, the array substrate 10 further comprises a pixel electrode 15 as shown in FIG. 1. As shown in FIG. 5, the opposite substrate 20 further comprises common electrode 23, the common electrode 23 corresponds to the pixel electrodes 15 one to one; the orthographic projections of the common electrode 23 and the additional electrode 22 on the second substrate 21 have no overlap.

It is noted that the common electrode 23 corresponds to the pixel electrode 15 one to one, that is the orthographic projection of the common electrode 23 on the first substrate 11 substantially overlap with the orthographic projection of the pixel electrode 15 on the first substrate 11, which leads to the pixel electrode 15 and the common electrode 23 can form a liquid crystal capacitance. In some embodiments, contours of the pixel electrode 15 and the common electrode 23 are substantially the same.

In addition, because the voltages of the common electrodes 23 are the same, all of the common electrodes 23 may be divided into a plurality of groups, in each of which the common electrodes 23 are electrically connected to each other, and the power is supplied to the common electrodes 23 in each group. Alternatively, all of the common electrodes 23 are electrically connected. The arrangement may be designed according to the actual situation.

On the one hand, the common electrode 23 is arranged on the opposite substrate 20, which can simplify the production process of the array substrate 10. On the other hand, the orthographic projections of the common electrode 23 and the additional electrode 22 on the second substrate 21 have no overlap, thus preventing generating a new parasitic capacitance when a pressure difference exists between the common electrode 23 and the additional electrode 22.

On the basis of this, it also may be the orthographic projection of the common electrode 23 on the first substrate 11 does not overlap with the orthographic projections of the gate line 12, or the data line 13, or the thin film transistor 14 on the first substrate 11. In this way, the generation of a new parasitic capacitance between the common electrode 23 and the gate lines 12, the data lines 13, the thin film transistors 14 and the like may be avoided.

Figure 6:
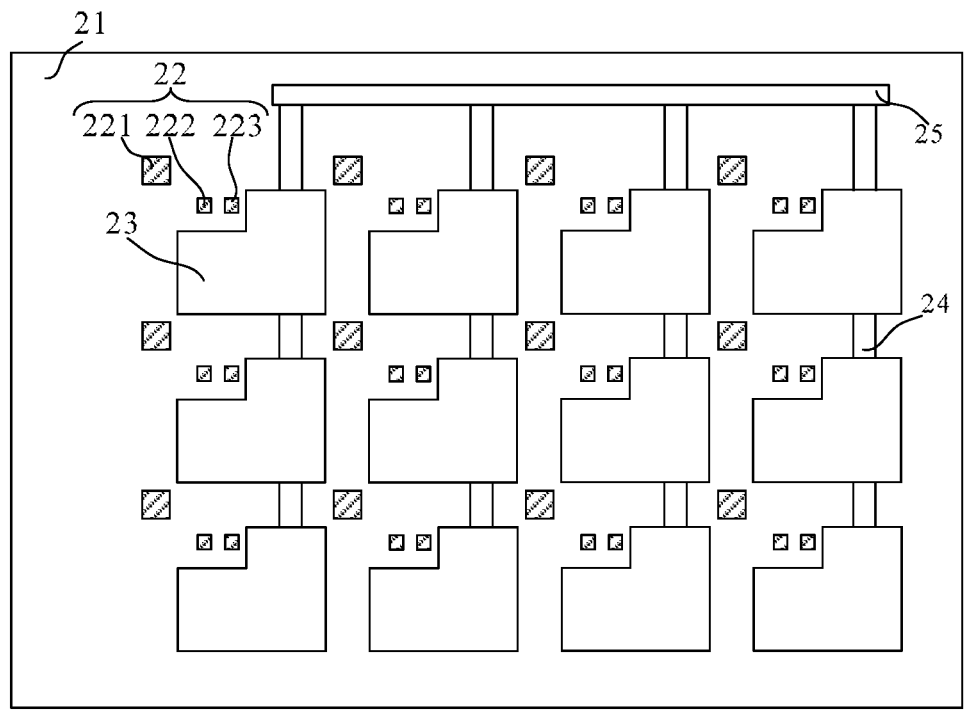
FIG. 6 is schematic top view of an opposite substrate provided in one or more embodiments of the present disclosure.
Figure 7:
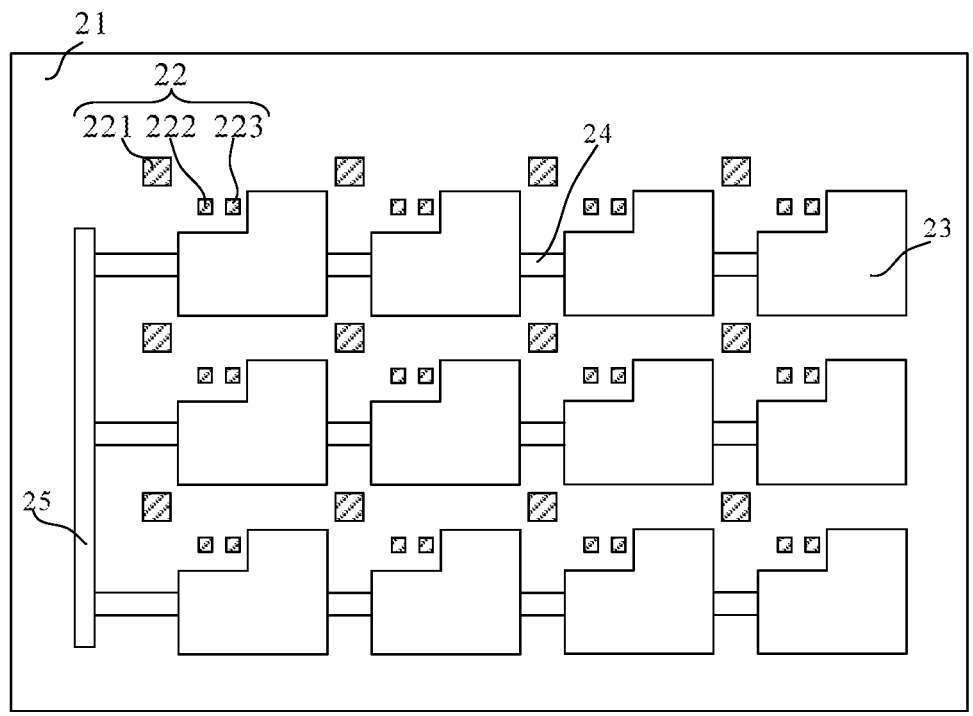
FIG. 7 is schematic top view of an opposite substrate provided in one or more embodiments of the present disclosure.

Further, as shown in FIG. 6, in each column of the common electrodes 23, the adjacent common electrodes 23 are electrically connected with each other through a common electrode connecting line 24; in each column of the common electrodes 23, the common electrode 23 located at a first edge of the second substrate 21 (the upper edge as shown in FIG. 6) is electrically connected to a common electrode lead 25;

Alternatively, as shown in FIG. 7, in each row of the common electrodes 23, the adjacent common electrodes 23 are electrically connected with each other through a common electrode connecting line 24; and in each row of the common electrodes 23, the common electrode 23 located at a second edge of the second substrate 21 (the right edge as shown in FIG. 7) electrically connected to a common electrode lead 25.

Figure 8:
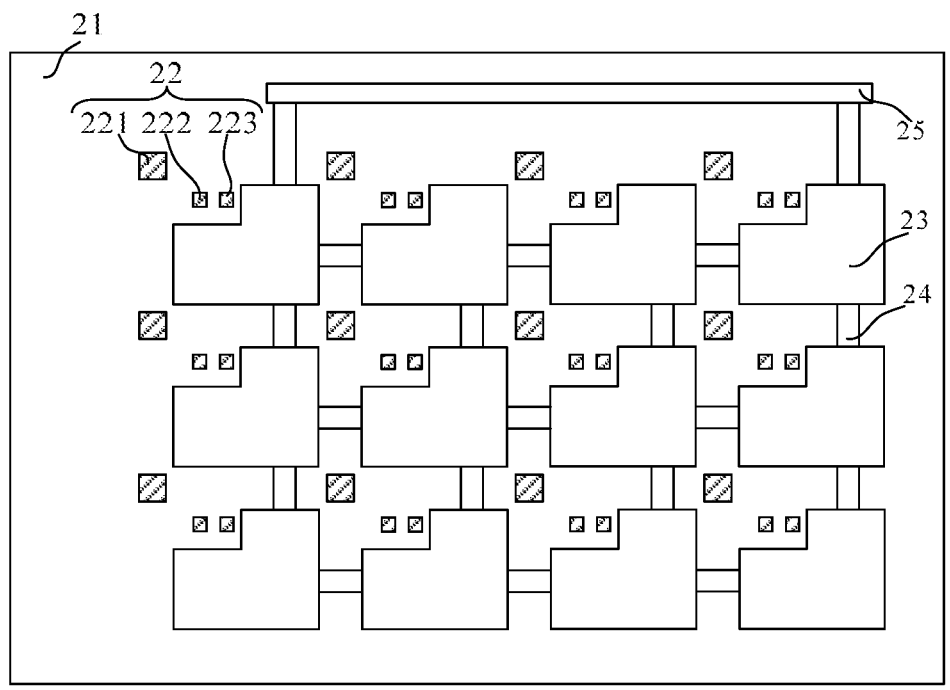
FIG. 8 is schematic top view of an opposite substrate provided in one or more embodiments of the present disclosure.

Alternatively, as shown in FIG. 8, all of the common electrodes 23 are electrically connected through the common electrode connecting line 24, all of the common electrode connecting lines 24 are arranged between adjacent common electrodes 23; at least one of the common electrodes 23 is electrically connected with the common electrode lead 25.

In this way, the supply to the common electrode 23 may be achieved, provided that the common voltage signal is input to the common electrode lead 25 located in the first edge of the second substrate 21 (the upper edge as shown in FIG. 8).

The common electrode 23, the common electrode connecting line 24, and the common electrode lead 25 may be arranged in the same layer. That is, the common electrode 23, the common electrode connecting line 24, and the common electrode lead 25 are formed in one patterning process.

In some embodiments, the common electrode 23 is insulated from and with a complementary contour with the additional electrode 22.

In some embodiments, the additional electrode 22 and the common electrode 23 are configured to be controlled independently.

Alternatively or additionally, the additional electrode 22 and the common electrode 23 are arranged in the same layer. That is, the additional electrode 22 and the common electrode 23 are formed in one patterning process, which can simplify the patterning processes.

Optionally, an insulating layer may be arranged between the additional electrode 22 and the common electrode 23 and the additional electrode 22 and the common electrode 23 are in different layers.

In some embodiments, the material of the additional electrode 22 is a transparent conductive material.

In some embodiments, the material of the additional electrode 22 is an opaque metal conductive material.

The transparent conductive material can be, for example, ITO (indium tin oxide), IZO (indium zinc oxide), and the like. The metal conductive material can be, for example, Al (aluminum), Mo (molybdenum), or the like.

In some embodiments, the opposite substrate 20 can further comprises a black matrix and a color filter layer.

Optionally, the color filter layer also may be arranged on the array substrate 10.

In some embodiments, the additional electrode 22 and the connect line is conformal with the black matrix. Optionally, the additional electrode 22 and the connect line has a same contour with the black matrix. Optionally, the additional electrode 22 completely overlaps with the black matrix.

The present disclosure further provides a display substrate in a display panel, wherein the display panel comprises: a first substrate; a gate line, a data line, and a thin film transistor with a gate electrode, a source electrode and a drain electrode on a surface of the first substrate; and a plurality of sub-pixel regions with each comprises a pixel electrode on the array substrate defined by the gate line and the data line; at least one sub-pixel region comprises: a first overlap region at an intersection region by the gate line and the data line, a second overlap region defined by an overlapping region between the gate electrode and the source electrode, or a third overlap region defined by an overlapping region between the gate electrode and the drain electrode; the display substrate comprising: a base substrate; a common electrode with a substantially same contour with the pixel electrode; and a plurality of additional electrodes with a complementary contour with the common electrode, wherein: the common electrode are insulated from the plurality of additional electrodes; and an orthographic projection of the additional electrodes on the first substrate substantially overlaps with orthographic projections of at least one of the first overlap region, the second overlap region, or the third overlap region on the first substrate.

The present disclosure further provides a display apparatus, which comprises the above display panel, and further comprises a first IC, a second IC, a third IC; the first IC is used for providing a scanning voltage to the gate line; the second IC is used for providing a data voltage to the data line; the third IC is used for providing a constant voltage to the additional electrode, the constant voltage is not equal to the scan voltage and the data voltage.

When all of the additional electrodes 22 are electrically connected through the connecting lines, the additional electrodes 22 may be easily supplied with power.

It is noted that since the voltage difference is needed between the electrodes generating the capacitance; so the above-mentioned first additional parasitic capacitance C11, and/or the second additional parasitic capacitance C22, and/or the third additional parasitic capacitance C33 generates only when the voltage supplied for the additional electrode 22 is different from the scanning voltage supplied for the gate line 12, and/or the voltage supplied for the additional electrode 22 is different from the data voltage supplied for the data line 13.

The display apparatus of the present disclosure has the same effects as the above-mentioned display panel, there is no repeat.

Alternatively or additionally, the third IC may be integrated in the first IC or the second IC. That is, the display apparatus, which comprises the above display panel, and further comprises one first IC integrated with functions of the second IC and the third IC mentioned above. In this way, the costs will be reduced.

The display apparatus may be a product or a component having any display function such as a liquid crystal television, a computer, a digital photo frame, a mobile phone, or the like.

The present disclosure provides a driving method for the display panel according to the above description, the method comprising inputting a scanning voltage to the gate line; inputting a data voltage to the data line; inputting a constant voltage different from the scan voltage and the data voltage to the additional electrode to generate at least one additional parasitic capacitance for offsetting parasitic capacitance generated by at least one of the gate line and the data line, the gate electrode and the source electrode, or the gate electrode and the drain electrode.

The present disclosure provides a driving method for the display apparatus, comprising: inputting a scanning voltage to the gate line 12, inputting a data voltage to the data line 13; a first parasitic capacitance generates C1 between the gate line 12 and the data line 13, a second parasitic capacitance C2 generates between the gate electrode 141 and the source electrode 142 of the thin film transistor, and a third parasitic capacitance C3 generates between the gate electrode 141 and drain electrode 143 of the thin film transistor; inputting a constant voltage to the additional electrode 22 to form a first additional parasitic capacitance C11 for offsetting the first parasitic capacitance C1, and/or a second additional parasitic capacitance C22 for offsetting the second parasitic capacitance C2, and/or a third parasitic additional capacitance C33 for offsetting the third parasitic capacitance C3.

For example, the principle of offsetting is as follows:

The first parasitic capacitance C1 may be expressed by the formula of $$C1 = \frac{\varepsilon s_1}{4\pi \kappa d_1},$$

the first additional parasitic capacitance C11 may be expressed by the formula of $$C11 = \frac{\varepsilon s_2}{4\pi \kappa d_2}.$$

Since the thickness of the liquid crystal cell is much larger than the distance between the gate line 12 and the data line 13 generating the first parasitic capacitance C1, that is d1<<d2 and S1=S2, so C1>>C11, $$\frac{C1}{C11} = \infty.$$

On this basis, C1 and C11 connect in series, and the equivalent capacitance of them is:

$$\frac{C1 \times C11}{C1 + C11} = \frac{C1}{1 + C1/C11}.$$

Based on this, the equivalent capacitance tends to zero due to $$\frac{C1}{C11} = \infty.$$

Similarly, as shown in FIG. 4B, when the orthographic projection of the additional electrode 22 and the orthographic projection of the second overlap region 32 on the first substrate 11 overlap and have equal areas, a second additional parasitic capacitance C22 generates between the additional electrode 22 and the gate electrode 141 near the additional electrode 22 in the second overlap region 32, or between the additional electrode 22 and the source electrode 142 near the additional electrode 22 in the second overlap region 32.

The second parasitic capacitance C2 may be expressed by the formula of $$C2 = \frac{\varepsilon s_3}{4\pi \kappa d_3},$$

the second additional parasitic capacitance C22 may be expressed by the formula of $$C22 = \frac{\varepsilon s_4}{4\pi \kappa d_4}.$$

Since the thickness of the liquid crystal cell is much larger than the distance between the gate electrode 141 and the source electrode 142 generating the second parasitic capacitance C2, that is d3<<d4 and S3=S4, so C2>>C22, $$\frac{C2}{C22} = \infty.$$

On this basis, C2 and C22 connect in series, and the equivalent capacitance of them is:

$$\frac{C2 \times C22}{C2 + C22} = \frac{C2}{1 + C2/C22}.$$

Based on this, the equivalent capacitance tends to zero due to $$\frac{C2}{C22} = \infty.$$

Similarly, as shown in FIG. 4C, when the orthographic projection of the additional electrode 22 and the orthographic projection of the third overlap region 33 on the first substrate 11 overlap and have equal areas, a third additional parasitic capacitance C33 generates between the additional electrode 22 and the gate electrode 141 near the additional electrode 22 in the third overlap region 33, or between the additional electrode 22 and the drain electrode 143 near the additional electrode 22 in the third overlap region 33.

The third parasitic capacitance C3 may be expressed by the formula of $$C3 = \frac{\varepsilon s_5}{4\pi\kappa d_5},$$

the third additional parasitic capacitance C33 may be expressed by the formula of $$C33 = \frac{\varepsilon s_6}{4\pi\kappa d_6}.$$

Since the thickness of the liquid crystal cell is much larger than the distance between the gate electrode 141 and the drain electrode 143 generating the third parasitic capacitance C3, that is d5<<d6 and S5=S6, so C3>>C33, $$\frac{C3}{C33} = \infty.$$

On this basis, C3 and C33 connect in series, and the equivalent capacitance of them is:

$$\frac{C3 \times C33}{C3 + C33} = \frac{C3}{1 + C3/C33}.$$

Based on this, the equivalent capacitance tends to zero due to $$\frac{C3}{C33} = \infty.$$

The present disclosure provides a driving method for the display apparatus, an additional parasitic capacitance is connected in series with the parasitic capacitance generating in the overlap region corresponding to the additional electrode 22 by inputting a constant voltage to the additional electrode 22, according to the capacitance formula, since the additional parasitic capacitance is much smaller than the parasitic capacitance generating in the overlap region on the array substrate 10, and thus the equivalent capacitance of the additional parasitic capacitance and the parasitic capacitance generating in the overlap region on the array substrate 10 tends to zero. Based on this, the parasitic capacitance generated by the array substrate 10 may be weakened or even eliminated, and the display effect will be improved.

As described above is only the specific embodiment of the present disclosure, but the scope of the present disclosure is not limited thereto, and various variation or substitution can be made by the person skilled in the art in the present disclosure are within the technical scope of the present disclosure. Accordingly, the scope of the present disclosure should be based on the scope of protection of the claims.

What is claimed is:

1. A display panel, comprising:
an array substrate comprising:
a first substrate;
a gate line, a data line, and a thin film transistor with a gate electrode, a source electrode and a drain electrode on a surface of the first substrate; and
a plurality of sub-pixel regions on the array substrate defined by the gate line and the data line; and
an opposite substrate comprising a second substrate, a plurality of additional electrodes arranged on a side of the second substrate facing the array substrate;
wherein at least one sub-pixel region comprises at least one of: a first overlap region at an intersection region by the gate line and the data line, a second overlap region defined by an overlapping region between the gate electrode and the source electrode, or a third overlap region defined by an overlapping region between the gate electrode and the drain electrode;
an orthographic projection of the plurality of additional electrodes on the first substrate substantially overlaps with orthographic projections of at least one of the first overlap region, the second overlap region, or the third overlap region on the first substrate;
all of the plurality of additional electrodes are electrically connected through a connecting line; and
the orthographic projections of the connecting line have non-overlapping region with the gate line and the data line on the first substrate.

2. The display panel according to claim 1, wherein:
the orthographic projection of the plurality of additional electrodes on the first substrate completely overlaps with the orthographic projections of the first overlap region, the second overlap region and the third overlap region.

3. The display panel according to claim 1, wherein the plurality of additional electrodes comprise a first additional sub-electrode;
the orthographic projections of the first additional sub-electrode and the first overlap region on the first substrate overlap and have equal areas.

4. The display panel according to claim 3, wherein the plurality of additional electrodes comprise a second additional sub-electrode;
the orthographic projections of the second additional sub-electrode and the second overlap region on the first substrate overlap and have equal areas.

5. The display panel according to claim 4, wherein the plurality of additional electrodes comprise a third additional sub-electrode;
the orthographic projections of the third additional sub-electrode and the third overlap region on the first substrate overlap and have equal areas.

6. The display panel according to claim 1, further comprising an additional electrode lead, wherein the connecting line is configured to be powered through the additional electrode lead.

7. The display panel according to claim 1, wherein the array substrate further comprises a pixel electrode, and the opposite substrate further comprises a common electrode; wherein contour of the pixel electrode is substantially the same as contour of the common electrode.

8. The display panel according to claim 7, wherein the additional electrode and the common electrode are configured to be controlled independently.

9. The display panel according to claim 7, wherein the pixel electrode and the common electrode overlap and have a same area.

10. The display panel according to claim 7, wherein the orthographic projections of the common electrode have non-overlapping region with the additional electrode on the second substrate.

11. The display panel according to claim 7, wherein all of the common electrodes are electrically connected with each other.

12. The display panel according to claim 7, wherein the additional electrode is in the same layer as the common electrode.

13. The display panel according to claim 7, further comprising an insulating layer between the additional electrode and the common electrode, the additional electrode and the common electrode are in different layers.

14. A display apparatus, comprising:
the display panel according to claim 1;
a first integrated circuit (IC) configured to provide a scanning voltage to the gate line;
a second IC configured to provide a data voltage to the data line; and
a third IC configured to provide a constant voltage to the additional electrode, and the constant voltage is not equal to the scan voltage and the data voltage.

15. The display apparatus according to claim 14, wherein the third IC is integrated with at least one of the first IC and the second IC.

16. A display substrate in a display panel comprising:
a first substrate;
a gate line, a data line, and a thin film transistor with a gate electrode, a source electrode and a drain electrode on a surface of the first substrate; and
a plurality of sub-pixel regions with each comprises a pixel electrode on the array substrate defined by the gate line and the data line;
at least one sub-pixel region comprises: a first overlap region at an intersection region by the gate line and the data line, a second overlap region defined by an overlapping region between the gate electrode and the source electrode, or a third overlap region defined by an overlapping region between the gate electrode and the drain electrode;
a display substrate comprising:
a base substrate;
a common electrode with a substantially same contour with the pixel electrode; and
a plurality of additional electrodes with a complementary contour with the common electrode, wherein:
the common electrode is insulated from the plurality of additional electrodes; and
an orthographic projection of the plurality of additional electrodes on the first substrate substantially overlaps with orthographic projections of at least one of the first overlap region, the second overlap region, or the third overlap region on the first substrate.

17. A driving method for the display panel according to claim 1 comprising:
the method comprising:
inputting a scanning voltage to the gate line;
inputting a data voltage to the data line;
inputting a constant voltage different from the scan voltage and the data voltage to the additional electrode to generate at least one additional parasitic capacitance for offsetting parasitic capacitance generated by at least one of the gate line and the data line, the gate electrode and the source electrode, or the gate electrode and the drain electrode.

18. The display panel according to claim 16, wherein:
the orthographic projection of the plurality of additional electrodes on the first substrate completely overlaps with the orthographic projections of the first overlap region, the second overlap region and the third overlap region.

19. The display panel according to claim 16, wherein the plurality of additional electrodes comprise a first additional sub-electrode;
the orthographic projections of the first additional sub-electrode and the first overlap region on the first substrate overlap and have equal areas.

20. The display panel according to claim 16, wherein the array substrate further comprises a pixel electrode, and the opposite substrate further comprises a common electrode; wherein contour of the pixel electrode is substantially the same as contour of the common electrode.

* * * * *